United States Patent Office 3,053,163
Patented Sept. 11, 1962

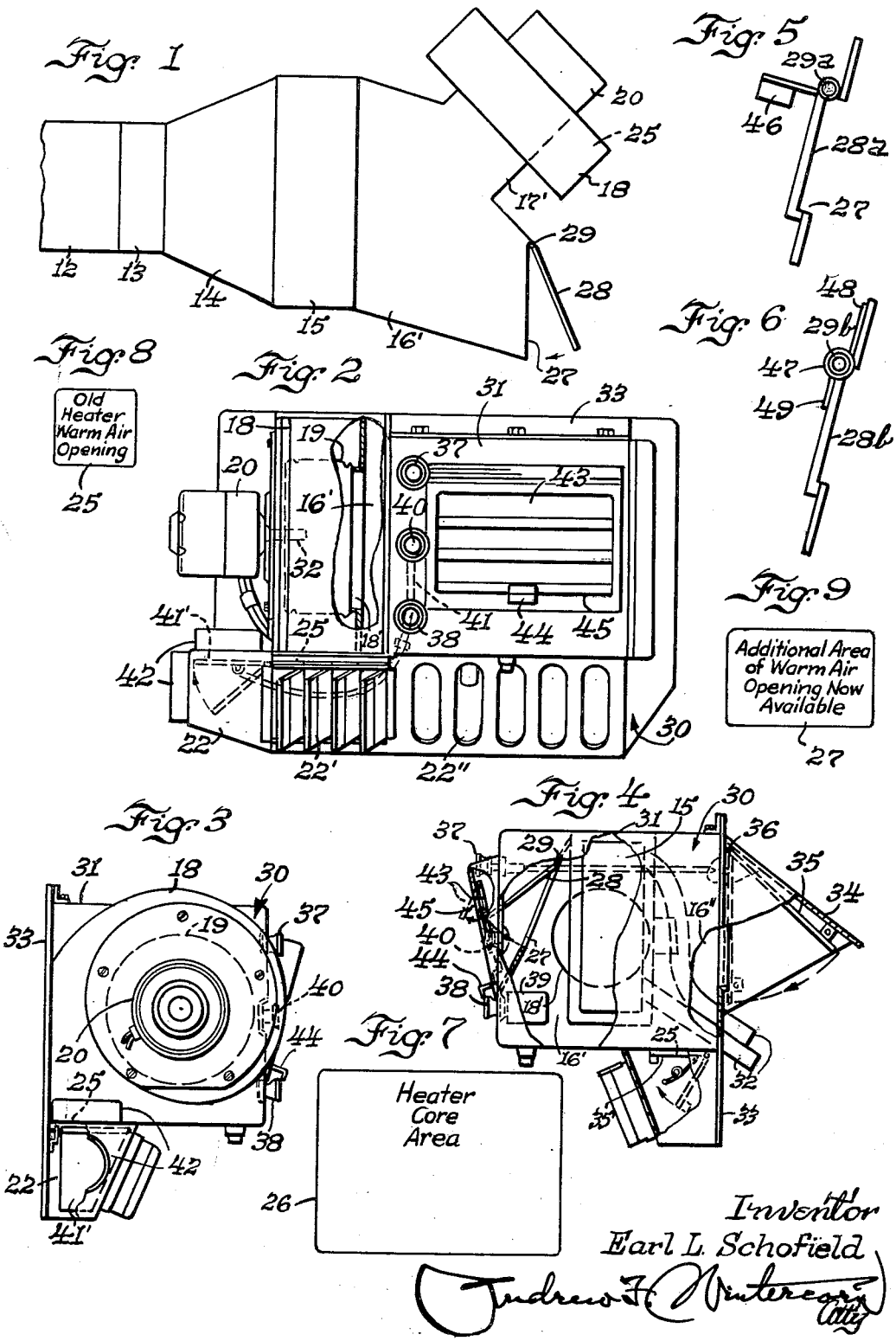

3,053,163
AUTOMOTIVE HEATER
Earl L. Schofield, Rockford, Ill., assignor to E. L. Schofield, Incorporated, Rockford, Ill., a corporation of Delaware
Filed Jan. 29, 1959, Ser. No. 789,948
6 Claims. (Cl. 98—2)

This invention relates to automotive heaters equipped with conventional ram or impact air intakes, wherein the inlet for fresh air is at the front of the vehicle, as distinguished from the air being merely re-circulated inside the vehicle.

Automotive heaters, as heretofore designed and constructed, have reflected a serious error on the part of heater manufacturers in regard to the handling of air flow through the core of the heat exchanger for the heating thereof and discharge into the passenger space, with the result that they have not been getting anywhere near the efficiency of heat exchange that the cores were designed to furnish. It is, therefore, the principal object of my invention to provide a heater of the kind mentioned involving a new combination including a damper-controlled auxiliary air intake that enables obtaining substantially the maximum heating efficiency that the core is capable of furnishing.

Automotive heaters, as heretofore designed and constructed, had a really small discharge opening which was proportioned in relation to the power of the motor and what the rotor constituting the load for the motor was capable of delivering, ignoring the considerable discrepancy between this area and the cross-sectional area of the core of the heat exchanger, so that there was, in fact, a "bottleneck" at the heat discharge end, and these heaters, so designed and constructed, were incapable of delivering to the passenger space anywhere near as much warm air as the core was capable of delivering.

In the heater of my invention, the air supplied through the ram type air intake passes through the core, as before, but the air discharged from the core is divided, part of it going, as before, through the inlet to the blower, and the rest through an outlet discharging directly into the passenger space, where it has impact with and opens a damper or flap valve that is normally arranged to stay closed, either under spring pressure, or the pressure of a counterweight, or by gravity, but is arranged to open more or less, depending upon the air pressure against the inside of the flap valve. Thus, when the vehicle in which the automotive heater of my invention is installed is in motion forwardly, the flap valve will be open more or less, depending usually upon the speed of the vehicle, regardless of whether the blower is turned on or not, but, when the vehicle stops, the flap valve will generally close, especially if the blower is turned on, because, in that event, there will be a certain reduction in pressure behind the flap valve. In any event, the area of the auxiliary warm air discharge opening afforded by the flap valve added to the area of the blower's discharge opening makes a total area that comes a lot closer to the core area, so that with the full delivery, allowing for the resistance to air travel through the core, the heater delivers as close to 100% of the available warm air into the passenger space as possible.

The invention is illustrated in the accompanying drawing, in which—

FIG. 1 is a diagrammatic showing of a heater operating on the principle of my invention;

FIGS. 2, 3, and 4 are three views of an automotive heater embodying the damper or flap valve of my invention;

FIGS. 5 and 6 are illustrations of a counterbalanced type and spring-restrained type of damper or flap valve, respectively, either of which, it should be understood, could be substituted for the gravity type damper or flap valve shown in FIG. 4;

FIG. 7 is a rectangle representative of the heater core area for the core shown in FIG. 4, as indicated by the legend "Heater Core Area";

FIG. 8 is a corresponding rectangle representative of the area of the warm air discharge opening of the blower of a conventional automotive heater as heretofore available, as indicated by the legend "Old Heater's Warm Air Opening," and FIG. 9 is a corresponding rectangle representative of the additional area of discharge opening that is made available by the addition of the auxiliary outlet opening and flap valve of my invention, as indicated by the legend "Additional Area of Warm Air Opening Now Available," the addition of the two areas of FIGS. 8 and 9 totalling approximately the area of air openings in the core area of FIG. 7.

The same reference numerals are applied to corresponding parts throughout the views.

In the old combination referred to above, a flexible, fresh cold air conduit extending rearwardly from the front of the car under the hood through an opening in the dash had connection with a manifold on the inlet side of the heater core. Hot water or other liquid coolant from the engine of the automotive vehicle was circulated through this core in the usual way, so that it served as a heat exchanger. The warm air leaving the core was conducted through a manifold into the inlet of a volute-shaped blower housing, wherein a seroco type fan driven by an electric motor received the warm air centrally thereof and discharged it under pressure tangentially through the discharge connection of the housing into a plenum chamber, from which the warm air was distributed through flexible tubes to the defroster nozzles behind and below the windshield and through one or more openings to the driver's and passenger's feet, depending upon what shutters were opened.

The important thing to note in this old combination is the small cross-sectional area of the discharge opening 25, which I have indicated by the rectangle 25 in FIG. 8. In contrast to this, the rectangle 26 shown in FIG. 7 represents the area of the heat exchanger core 15, and it will be seen that the area 25 represents less than one-fourth of the area of the air openings in area 26. The erroneous reasoning evident here is that other heater manufacturers in determining the size of the discharge opening 25 based it on the known horse-power of the motor of the heater and the known load for said motor, namely, the rotor of the blower therefore, and what amount of air that rotor was capable of delivering, never realizing apparently the considerable difference between the relatively large area 26 of the core 15 and the relatively small area 25 of the discharge opening. That is the reason I have referred to the opening 25 as a "bottle neck," because with it the heater is obviously incapable of delivering into the passenger space as much warm air as the core 15 is capable of delivering.

In accordance with my invention, as shown in FIG. 1, there is the same conventional ram or impact type air intake 12 leading to the heater core 15, but I bypass a large amount of warm air into the passenger space through an auxiliary warm air outlet opening 27 where a gravity type flap valve or damper 28 is pivoted, as at 29. The area of this auxiliary warm air outlet opening 27 is illustrated by the rectangle 27 in FIG. 9, which, added to the area 25, gives a total effective area much nearer the actual amount of total air opening in the core area 26. Hence, I can come as close to delivering 100% of the available warm air into the passenger space as possible when the flap valve 28 is fully opened, as when the vehicle is traveling forwardly at cruising or higher speed. The flap valve 28, tending to close by gravity, is arranged to open more or less, depending upon the air pressure active against the inner side of said valve. Thus, depending upon the speed of the vehicle, the flap valve 28 may be opened half way or wide open regardless of whether the driver has the blower going or not, so long as the fresh air intake is open. Then, when the vehicle stops, the flap valve 28 will generally close, especially if the blower is turned on, because, in that event, there will be a reduction in pressure in the outlet chamber or manifold 16'. The latter, as shown in FIG. 1, has another outlet 17' which discharges air at 25, into a plenum chamber for delivery of warm air through the defroster tube or tubes in the usual way and through one or more openings into the passenger space.

Referring to FIGS. 2, 3, and 4 which illustrate a heater, indicated generally by the reference numeral 30, embodying my invention, the blower wheel or rotor 19 is best shown in FIG. 2 inside the volute-shaped housing 18 provided on one end of the sheet metal housing 31 of the heater, the electric motor 20 for driving the rotor 19 being mounted on one side of the housing 18 and having its armature shaft 32 extending into the housing and connected with the rotor 19, as seen in FIG. 2. The core 15 for the heater appears in FIG. 4 and has flexible tubes 32 extending from the top and bottom manifolds thereof in the usual way for connection in front of the dash with flexible hoses leading to and from the engine cooling system for circulation of warm water or other liquid coolant through the core in the usual way, the heater 30 being mounted on the dash by means of a back plate 33 and having a scoop 34 projecting forwardly therefrom under the engine hood for connection with the rear end of the flexible fresh air inlet tube 12 (FIG. 1) in the usual way. The core 15 has its left hand end spaced from the adjacent end wall of chamber 16' so that warm air from the core 15 can pass through intake opening 18' of blower housing 18 and be picked up by the rotor 19 and discharged under pressure at 25 into the plenum chamber 22, to be delivered either directly toward the driver, if the louvers 22' are opened for that purpose, or to the defroster nozzles through the necks 42, or both. The damper indicated at 35 in FIG. 4 pivoted at 36 is operable by means of the fresh air button 37, the damper being closed when the button is pulled out and open when the button is pushed in, whereby to enable heating with fresh air or only with air re-circulated in the passenger space. The amount of fresh air supplied may also be regulated in this way. The openings 22" opening into the lower front portion of the housing 31 are for recirculation of air from within the passenger compartment when the damper 35' is opened, allowing this air to enter the bottom of the inlet chamber 16". The fan button 38, which is also a push-pull button, controls the motor 20 by means of switch 39. Defroster button 40 has a cable 41 extending therefrom to operate a damper 41' provided in one end of the chamber 22 where necks 42 are provided for connection of flexible tubes leading to the usual defroster nozzles provided behind and below the windshield. Louvers 43 are opened or closed by means of a handle 44 on the front of the heater to allow more or less warm air to be discharged directly through the front discharge opening 45 into the passenger space. In accordance with my invention, as described above, there is also provided a gravity type damper or flap valve 28 pivoted at 29 inside the housing 31 controlling the flow of warm air through an auxiliary warm air discharge opening 27, as illustrated in FIG. 4, the opening 45 in the front of the heater allowing this additional warm air to be delivered directly into the passenger space to supplement what is delivered at 25 directly from the discharge end of the blower housing 18, whose inlet opening communicates with the chamber 16' on the warm air side of the core 15 and behind the damper 28.

While I have shown a gravity type flap valve or damper 28 in FIGS. 1 and 4, it should be understood that my invention is not limited specifically to that type, inasmuch as I may provide a counterbalanced type, as shown at 28a in FIG. 5, wherein 29a is the pivot and 46 is a counterweight carried on the pivoted end of the flap valve, tending normally to hold it closed and serving to resist the opening thereof, another type being the spring-restrained type shown at 28b in FIG. 6, wherein 29b is the pivot and 47 is a torsion spring encircling the pivot pin and having one end 48 fixed and the other end 49 movable with the flap valve to resist the opening thereof and serving normally to hold the same closed.

It is believed the foregoing description conveys a good understanding of the objects and advantages of my invention. The appended claims have been drawn to cover all legitimate modifications and adaptations.

I claim:

1. In a ram type vehicle heater comprising, in combination a casing having an inlet chamber and an outlet chamber provided therein, a heat-exchanger core in said casing between said chambers, said core having air passages therethrough and liquid conduits in heat-exchange relationship to the air flowing through the air passages, the liquid conduits having hot liquid circulated therethrough, a fresh air inlet conduit conducting air from the front of a vehicle to the inlet chamber and heat exchanger core for flow through the air passages therein, whereby the forward motion of the vehicle causes fresh air to be scooped and to impinge upon the core under pressure, said outlet chamber having an opening, a blower mounted over the opening for receiving some of the warmed air discharged into said outlet chamber and delivering it under pressure to the passenger space in the vehicle, said outlet chamber having an auxiliary warm air discharge opening provided therein communicating with said outlet chamber to discharge the balance of the warmed air discharged into said outlet chamber into the passenger space, and a damper serving as a closure for said auxiliary warm air discharge opening pivotally mounted on said outlet chamber to swing outwardly relative thereunder from closed position and having means tending to close the same automatically, said damper being openable in response to air pressure in said outlet chamber.

2. A vehicle heater as set forth in claim 1, wherein said damper tends to swing to closed position by gravity.

3. A vehicle heater as set forth in claim 1, wherein said damper tends to swing to closed position by gravity and has a counterweight carried thereby to assist in the closing thereof.

4. A vehicle heater as set forth in claim 1, wherein said damper tends to swing to closed position by gravity and has spring means connected therewith to assist in the closing thereof.

5. A vehicle heater as set forth in claim 1, including a manually operable means for regulating flow of fresh air through the fresh air inlet conduit.

6. A vehicle heater as set forth in claim 1, wherein the cross-sectional area of the air delivery opening of the blower and the cross-sectional area of the air delivery opening of the auxiliary warm air discharge opening added together are approximately equal to the total cross-sectional area of the air passages in said heat exchanger core.

References Cited in the file of this patent

UNITED STATES PATENTS

| | | |
|---|---|---|
| 538,972 | McGuire et al. | May 7, 1895 |
| 2,249,957 | Holmes | July 22, 1941 |
| 2,647,451 | Aufiero | Aug. 4, 1953 |
| 2,741,972 | Pryne | Apr. 17, 1956 |
| 2,756,663 | Little | July 31, 1956 |
| 2,800,853 | Spear | July 30, 1957 |